United States Patent
Lau

(10) Patent No.: US 7,512,991 B2
(45) Date of Patent: Mar. 31, 2009

(54) METHODS, SYSTEMS, SIGNALS AND MEDIA FOR ENCOURAGING USERS OF COMPUTER READABLE CONTENT TO REGISTER

(75) Inventor: James Sheung Lau, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 935 days.

(21) Appl. No.: 10/015,378

(22) Filed: Dec. 12, 2001

(65) Prior Publication Data

US 2002/0091943 A1    Jul. 11, 2002

(30) Foreign Application Priority Data

Dec. 15, 2000  (CA) .................................... 2328644

(51) Int. Cl.
  H04L 9/00  (2006.01)
  G06F 7/04  (2006.01)
(52) U.S. Cl. ................... 726/32; 726/31; 705/51; 705/57; 705/59; 705/77; 705/78; 705/79
(58) Field of Classification Search .......... 705/51, 705/52, 53, 412, 57, 59, 77–79; 713/190, 713/191, 193; 726/33, 31, 32
See application file for complete search history.

(56) References Cited

U.S. PATENT DOCUMENTS

| | | | |
|---|---|---|---|
| 4,685,055 A | | 8/1987 | Thomas |
| 4,796,220 A * | | 1/1989 | Wolfe .......................... 705/56 |
| 5,065,429 A | | 11/1991 | Lang |
| 5,103,476 A * | | 4/1992 | Waite et al. .................. 705/59 |
| 5,138,712 A * | | 8/1992 | Corbin ......................... 726/30 |
| 5,509,070 A * | | 4/1996 | Schull ......................... 705/54 |
| 5,532,920 A | | 7/1996 | Hartrick et al. |
| 5,680,452 A | | 10/1997 | Shanton |
| 5,883,954 A * | | 3/1999 | Ronning ....................... 705/52 |
| 5,892,825 A * | | 4/1999 | Mages et al. .................. 705/51 |
| 5,892,900 A * | | 4/1999 | Ginter et al. ................. 713/200 |
| 5,946,677 A * | | 8/1999 | Bullen ........................... 707/2 |
| 5,991,399 A * | | 11/1999 | Graunke et al. ............. 380/279 |
| 6,009,543 A * | | 12/1999 | Shavit ......................... 712/200 |
| 6,041,411 A * | | 3/2000 | Wyatt .......................... 726/29 |
| 6,070,171 A * | | 5/2000 | Snyder et al. ............... 707/203 |
| 6,073,256 A * | | 6/2000 | Sesma .......................... 714/38 |
| 6,223,288 B1 * | | 4/2001 | Byrne ......................... 713/190 |

(Continued)

OTHER PUBLICATIONS

Wikipedia, "Applet," available at http://www.wikipedia.org/wiki/Applet, p. 1.*

(Continued)

Primary Examiner—Michael J Simitoski
(74) Attorney, Agent, or Firm—A. Bruce Clay, Esq.; Steven M. Greenberg, Esq.; Carey Rodriguez Greenberg & Paul LLP

(57) ABSTRACT

A method and system for encouraging users of computer readable content to register. The method involves embedding in the computer readable content, instruction codes operable to direct a processor circuit to automatically establish a connection to a server, when the content is in use by the processor circuit, to transmit registration information to the server and operable to control further use of the content by the processor circuit in response to a key received from the server.

2 Claims, 4 Drawing Sheets

U.S. PATENT DOCUMENTS

| | | | |
|---|---|---|---|
| 6,230,194 B1* | 5/2001 | Frailong et al. | 709/220 |
| 6,236,971 B1* | 5/2001 | Stefik et al. | 705/1 |
| 6,243,468 B1* | 6/2001 | Pearce et al. | 380/255 |
| 6,453,420 B1* | 9/2002 | Collart | 726/26 |
| 6,453,469 B1* | 9/2002 | Jystad | 717/174 |
| 6,687,745 B1* | 2/2004 | Franco et al. | 709/219 |
| 6,748,362 B1* | 6/2004 | Meyer et al. | 704/500 |
| 6,784,925 B1* | 8/2004 | Tomat et al. | 348/207.11 |
| 6,882,979 B1* | 4/2005 | Reay et al. | 705/26 |
| 6,920,567 B1* | 7/2005 | Doherty et al. | 726/22 |
| 6,966,002 B1* | 11/2005 | Torrubia-Saez | 705/51 |
| 6,968,499 B1* | 11/2005 | Minami et al. | 715/500 |
| 2002/0046181 A1* | 4/2002 | Story et al. | 705/59 |
| 2003/0078853 A1* | 4/2003 | Peinado et al. | 705/26 |
| 2004/0205358 A1* | 10/2004 | Erickson | 713/200 |
| 2004/0225900 A1* | 11/2004 | Colvin | 713/202 |

OTHER PUBLICATIONS

"Applet," Microsoft Computer Dictionary, Fifth Edition, Microsoft Press, 2002, p. 31.*

Wikipedia, "Applet," available at http://www.wikipedia.org/wiki/Applet, p. 1, printed 2005.*

\* cited by examiner

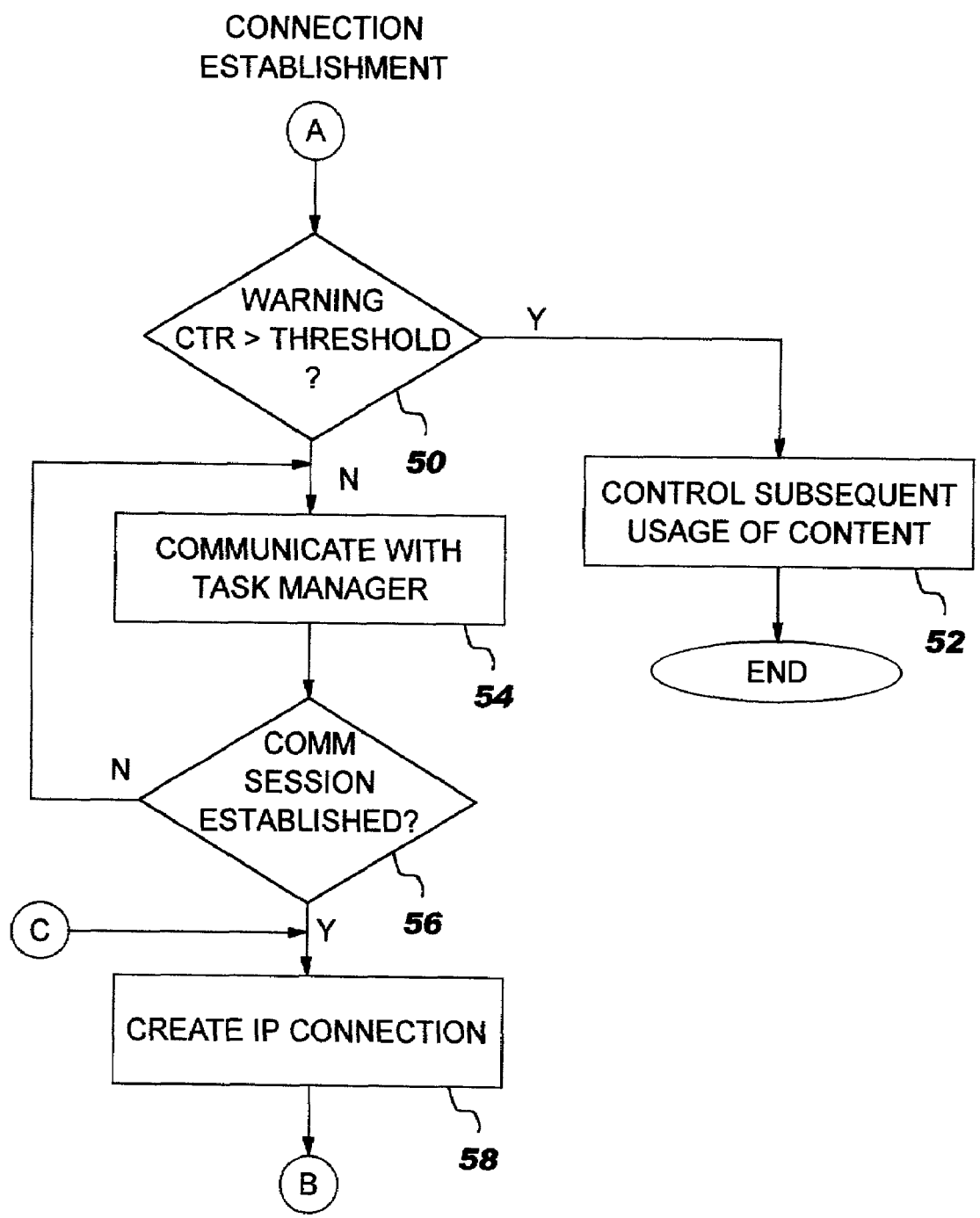

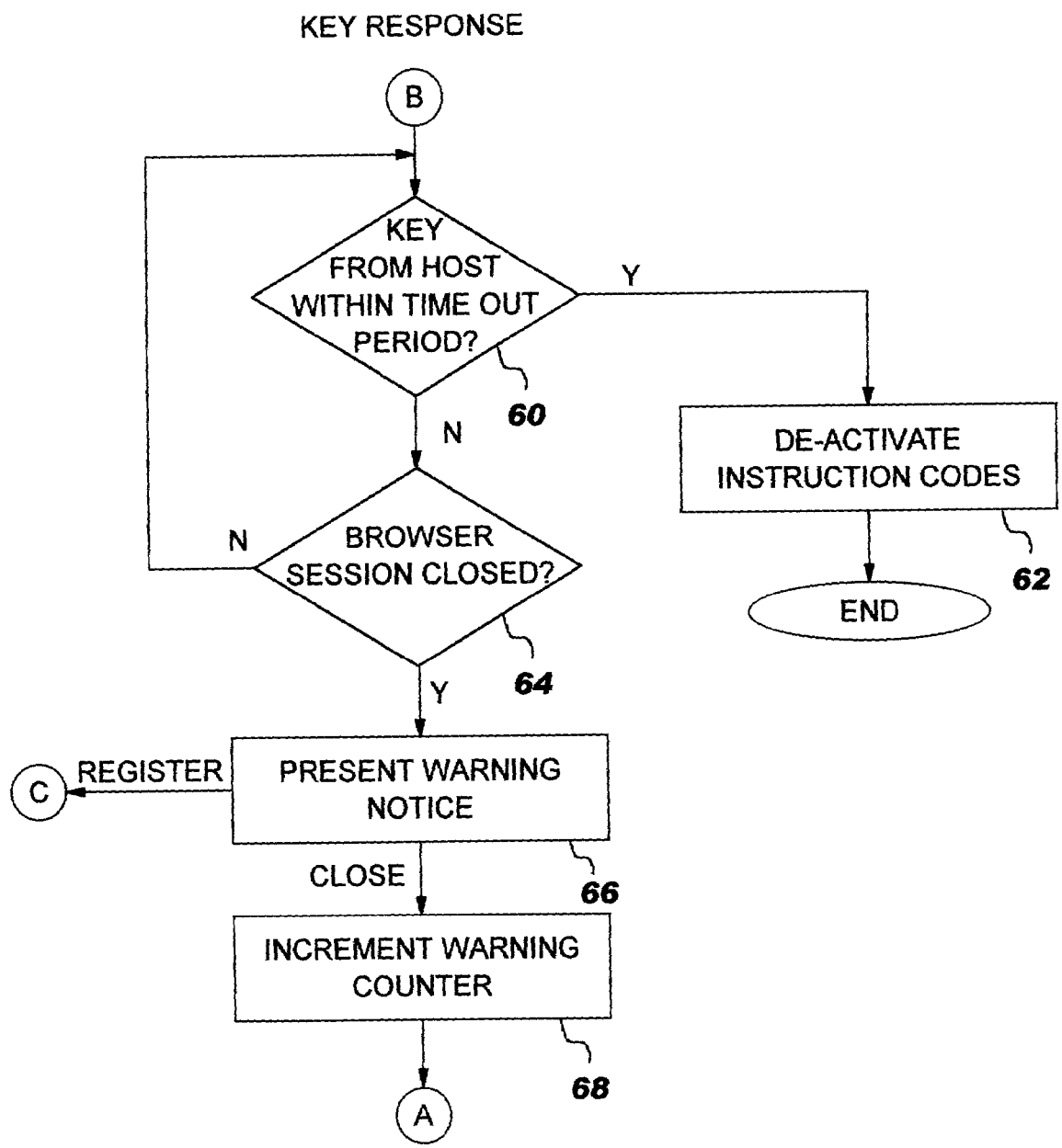

METHODS, SYSTEMS, SIGNALS AND MEDIA FOR ENCOURAGING USERS OF COMPUTER READABLE CONTENT TO REGISTER

BACKGROUND OF THE INVENTION

1. Field of Invention

This invention relates to user registration of software and more particularly to methods, systems, signals and media for encouraging users of computer readable content to register with a server.

2. Description of Related Art

With the proliferation of computer readable content for sale such as software applications, music, data or movie files, for example, available for purchase on computer readable media such as a CD- ROM®, or a DVD® or floppy disc, or available for download via an Internet connection with a web server, unauthorized access and copying of computer readable content has become more and more widespread. Currently a computer user attempting to gain access to locked content such as on a CD-ROM®, must make live contact with the content owner or licensor and must purchase or license a key to access the content. This is inefficient and does not restrict the user from making use of the application on other computers or from providing the key to others to the detriment of the content owner. What is needed therefore is a more robust way to ensure that a person accessing the computer readable content is authorized to do so. In particular, it would be advantageous to have a way to restrict access to the content so that it can only be accessed from a single user's computer. This would effectively prevent unauthorized access to the content even if large numbers of copies of the work are distributed without control.

SUMMARY OF THE INVENTION

The present invention addresses the above problem by providing a method for encouraging users of computer readable content to register. The method includes embedding in the computer readable content, instruction codes operable to direct a processor circuit to automatically establish a connection to a server, when the content is in use by the processor circuit. The instruction codes are operable to direct a processor circuit to transmit registration information to the server and operable to control further use of the content by the processor circuit in response to a key received from the server.

The method may also include embedding a self-executing applet in the computer readable content, and producing the applet such that the applet contains the instruction codes.

The method may also include embedding a self-executing apple in the computer readable content, and producing the apple such that the apple contains the instruction codes.

In accordance with another aspect of the invention there is provided a method for encouraging users of computer readable content to register. The method includes providing to a user computer the computer readable content and instruction codes embedded in the computer readable content. The instruction codes are operable to direct a processor circuit of the user computer to automatically establish a connection to a server, when the content is in use by the user computer, to transmit registration information to the server and operable to control further use of the content by the user computer in response to a key received from the server.

The method may include transmitting the computer readable content and the embedded instruction codes to the user computer, on a communications network, and/or providing a computer readable medium to a user. The computer readable medium may have stored thereon the content and the embedded instruction codes.

In accordance with another aspect of the invention there is provided a method for encouraging users of computer readable content to register. The method includes executing instruction codes embedded in the computer readable content, when the content is in use by a processor circuit, to automatically establish a connection to a server to transmit registration information to the server and to control subsequent use of the content by the processor circuit in response to a key received from the server.

The method may include causing the instruction codes to be executed when access is made to the content by the processor circuit and producing a measure of use of the content by the processor circuit, which may further include determining a number of times the content is accessed by the processor circuit, and/or determining memory usage of functional descriptive content in the computer readable content, and/or determining document usage by functional descriptive content in the computer readable content. The method may also include establishing the connection to the server when the measure of use exceeds a threshold value, by establishing an Internet protocol connection with the server.

The method may also include launching a browse session with a uniform resource locator pointing to a user registration page for permitting a user to enter registration information. The method may also include controlling subsequent use of the content by enabling subsequent use of the content when the key is received from the server, and disabling further use of the content when no key is received from the server.

The method may also include deleting files produced by functional descriptive content in the computer readable content, warning a user of the processor circuit that files are about to be deleted, maintaining a count of the number of times a warning about deleting files is presented to a user of the processor circuit, and deleting files produced by functional descriptive content in the computer readable content when the count exceeds a threshold value.

In accordance with another aspect of the invention there is provided a method of controlling use of computer readable content. The method includes transmitting to a user computer a key operable to co-operate with the user computer to deactivate execution of instruction codes embedded in the computer readable content at the user computer, in response to receipt of registration information from the user computer.

The method may also include hosting a uniform resource locator pointing to a user registration page for permitting a user to provide the registration information to register as a user of the computer readable content. The method may also include validating the registration information, and transmitting the key to the user computer when the registration information is successfully validated.

In accordance with another aspect of the invention, there is provided a computer readable medium on which is stored computer readable content and instruction codes embedded in the computer readable content, the instruction codes being operable to direct a processor circuit to automatically establish a connection to a server, when the content is in use by the processor circuit, to transmit registration information to the server and operable to control further use of the content by the processor circuit in response to a key received from the server.

In accordance with another aspect of the invention, there is provided a data signal comprising a first code segment providing computer readable content and a second code segment embedded in the first code segment such that the second code segment is rendered operational when the first segment is used. The second code segment comprises instructions for directing a processor circuit to automatically establish a connection to a server, when the content is in use by the processor circuit, to transmit registration information to the server and operable to control further use of the content by the processor circuit in response to a key received from the server.

In accordance with another aspect of the invention, there is provided a system operable to encourage users of computer readable content to register. The system includes a processor circuit, a communications interface in communication with the processor circuit for communicating with a server, and a receiver for receiving computer readable content with instruction codes embedded therein. The instruction codes are operable to cause the processor circuit to automatically cause the communications interface to establish a connection to a server to transmit registration information to the server, and to control subsequent use of the computer readable content by the processor circuit, in response to a key received from the server.

In accordance with another aspect of the invention, there is provided a system for controlling the use of computer readable content. The system includes a receiver for receiving registration information from a user computer, and a transmitter for transmitting to a user computer a key operable to cooperate with the user computer to deactivate execution of instruction codes embedded in computer readable content at the user computer, in response to receipt of registration information at the receiver.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention,

FIG. 4 is a flowchart of a connection establishment portion of the applet shown in FIG. 2;

FIG. 5 is a flowchart of a key response portion of the applet shown in FIG. 2.

DETAILED DESCRIPTION

Figure 1:
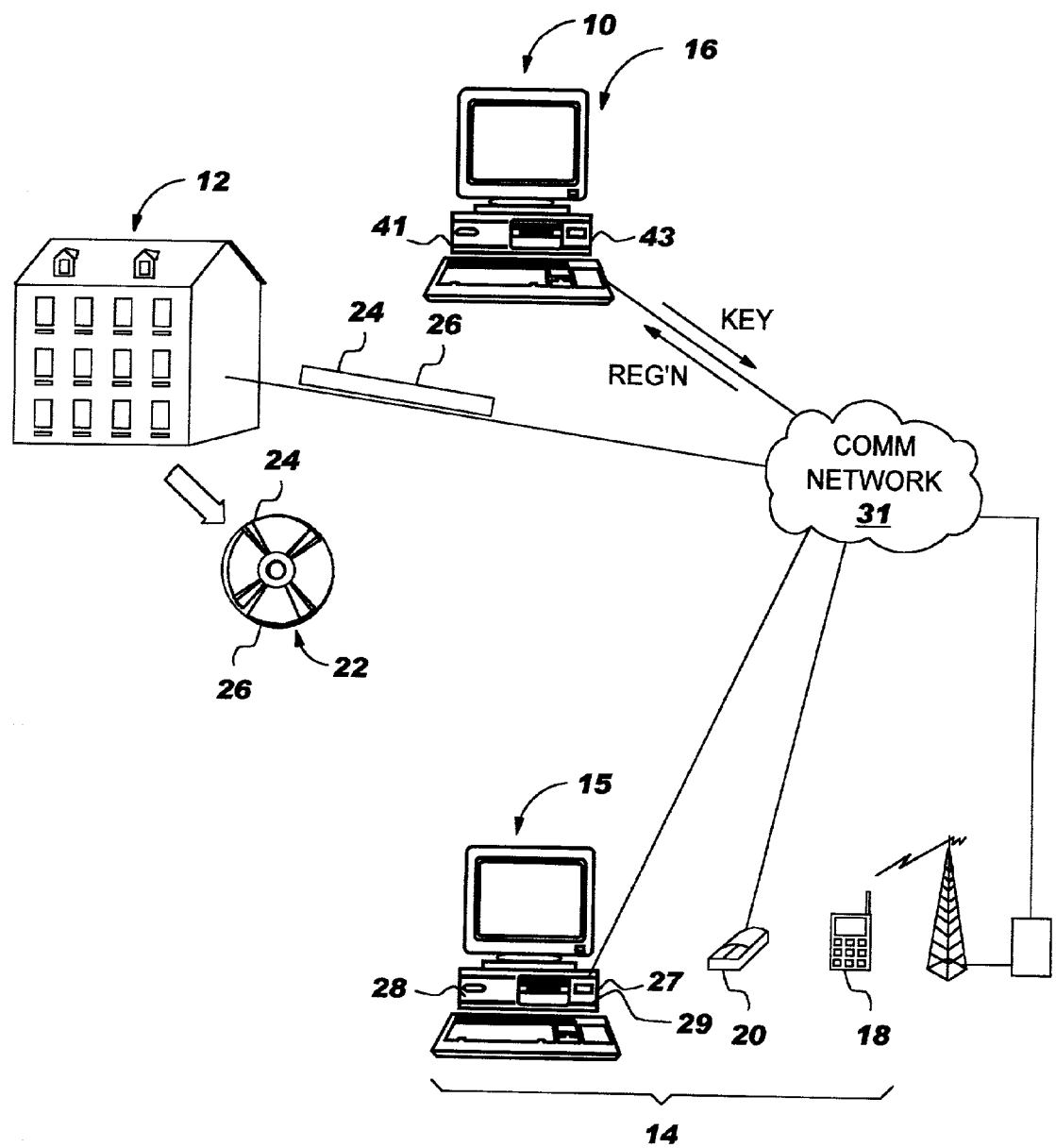
FIG. 1 is a pictorial representation of a system for encouraging users of computer readable content to register, according to a first embodiment of the invention.

Referring to FIG. 1, a system for encouraging users of computer readable content to register, according to a first embodiment of the invention is shown generally at 10. In this embodiment the system includes a computer readable content provider 12, a user computer 14 and a server 16. The computer readable content provider 12 provides functional descriptive computer readable content and/or functional non-descriptive content for use by user computers such as user computer 14. The server 16 provides a registration service for legitimate users of the computer readable content provided by the content provider 12. In general, functional descriptive computer readable content may include a program such as Netscape Communicator®, Lotus 1-2-3®, or Microsoft Word®, for example and generally describes any computer readable instructions which cause a processor circuit to carry out some designated functionality. Non-functional descriptive computer readable content may include music, video, or graphic content, for example and generally describes any computer readable content defining information.

The user computer described herein may be a conventional personal computer such as shown as 15, a personal data assistant 18, a Moving Pictures Expert Group Layer-3 (MP3) player 20, or any other program execution or content using device having a processor circuit for executing computer readable instructions or for manipulation of information content. The user computer in this embodiment is also operable to establish communications using an Internet Protocol and includes a browse for supporting communications of this type.

In accordance with one aspect of the invention described herein, the content provider 12 presents a method for encouraging users of computer readable content to register, involving embedding in the computer readable content, instruction codes operable to direct a user computer 14 to automatically establish a connection to the server 16, when the content is in use by the user computer 14, to transmit registration information to the server 16 and operable to control further use of the content by the user computer 14 in response to a key received from the server 16, such that the instruction codes are automatically executed by the user computer 14 when the computer readable content is used by the user computer 14.

Effectively, the content provider 12 writes records, or otherwise acquires computer readable content it intends to provide to users. The computer readable content 24 might be of the type which is distributed to users by sale, in stores, on portable computer readable media such as a floppy disk, CD-ROM 22, or DVD® for example, or by distribution of the content using an IP protocol network such as the Internet. However, prior to finalizing the content for distribution, or during development of the content, for example, instruction codes 26 are embedded therein. This may be accomplished by incorporating the instruction codes 26 into an applet, such as a self executing Java® applet embedded in the program such that the applet is automatically executed when the content is executed, if it is functional descriptive content or such that the applet is automatically executed when the content is accessed, if it is non-functional descriptive content. The content and embedded applet can then be burned onto a CD-ROM 22 or recorded on a floppy disk, for example, or may be made available for distribution on a communications network such as an IP protocol network operating as an intranet, or internet, for example. In general, any of the aforementioned modes of distribution may be used to provide to a user computer the computer readable content 24 and instruction codes 26 embedded in the computer readable content 24.

Once the content 24 with embedded instruction codes 26 is received at the user computer 14, the content may be rendered operational by executing a setup or run program, for example, where the user computer is a personal computer 15, for configuring the operating system of the personal computer to respond to the content. The use of setup or run programs for rendering programs operational in personal computers is well known and therefore not described further here.

If, for example, the content 24 is provided to the user on a CD-ROM 22, the user inserts the CD-ROM 22 into a receiver, such as a media reader 27 the user computer 14 and performs the usual operations to invoke the program. This may include, for example operating a user input device at the user computer to execute a run command offered by the operating system of the user computer 14. In this embodiment, the operating system may generally be any operating system which has a Java® Virtual Machine that supports Java® applets, where the instruction codes according to this embodiment are provided as a Java® applet. Alternatively, specific versions of the instruction codes may be provided in languages such as C or C++, where the operating system does not support Java®. The operating system may be Windows 98.RTM. for example, in which case execution of the run command invokes the Microsoft program utility which will load the content and embedded applet into operational memory for execution and use by a processor circuit 28 of the user computer 14. The program utility also launches any functional descriptive content, e.g., any program, causing it to be executed by the processor circuit 28 and also launches the instruction codes 26 for simultaneous execution by the processor circuit. Effectively, by launching the instruction codes 26, the user computer 14 executes instruction codes embedded in the computer readable content 24, when the content is in use by the processor circuit 28, to automatically cause a communications interface 29 at the user computer 14 to establish a connection to the server 16 through a communications network 31 such as the Internet, to transmit registration information to the server and to control subsequent use of the content by the processor circuit in response to a key received from the server. This communications interface 29 may include an Internet browse to support such communications, for example.

In general, whenever the processor circuit 28 is directed by the user to access the content, either by running the functional descriptive content portion or by accessing a non-functional descriptive portion or both, the instruction codes 26 are run. Thus the processor circuit 28 is caused to execute the instruction codes 26 when access is made to the content 24 or the content is used.

Figure 2:
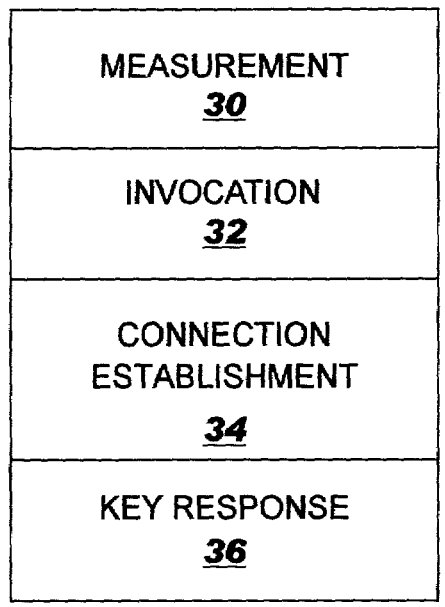
FIG. 2 is a tabular representation of portions of an applet to be used in the system shown in FIG. 1.

Referring to FIG. 2, in this embodiment, the instruction codes 26 are provided in an applet having four main portions including a measurement portion 30, an invocation portion 32, a connection establishment portion 34 and a key response portion 36. The measurement portion 30 includes instructions for directing the processor circuit 28 to produce a measure of use of the content by the processor circuit. In one embodiment, this may involve monitoring the number of bytes used in a designated folder maintained by the functional portion of the content. For example, if the functional portion maintains a document folder in which documents produced and edited by the user are stored, the measurement portion 30 may monitor the number of bytes attributed to this folder to produce a measure of the number of bytes that have been produced in response to user activity.

Alternatively, the measurement portion 30 may count the number of files created by the user in a designated folder. Or, a count of the number of accesses to non-functional content may be kept, particularly in the case where the non-functional content is music, video, or graphical information, for example.

Figure 3:
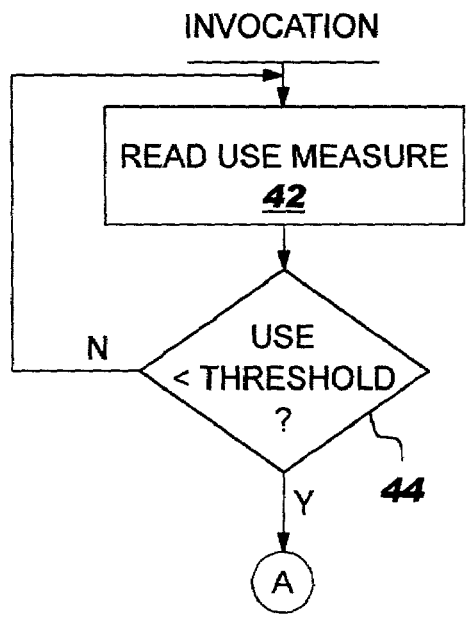
FIG. 3 is a flowchart of an invocation portion of the applet shown in FIG. 2.

Referring to FIG. 3, the invocation portion of the applet is shown generally at 32, as a plurality of blocks of code, each of which serves a function as depicted by corresponding labels associated with each block. A first block of codes 42 directs the processor circuit 28 to communicate with the measurement portion 30 to determine a measure of the use of the content 24 by the user. A second block 44 directs the processor circuit 28 to determine whether or not the amount of use exceeds a pre-defined threshold amount and if the usage of the program has not exceeded the pre-defined threshold, no action is taken. However, if the usage has exceeded the pre-defined threshold, the connection establishment portion 34 shown in FIG. 2 is executed.

For example, if the user has produced more than 5 documents, or if the user has stored documents amounting to more than 100 K bytes, of if access has been made to non-functional content more than 2 times, where 5, 100 K and 2 are the threshold values, and at least one of these values has been exceeded, the connection establishment portion 34 is executed to establish a connection to the server 16. It should be appreciated that not all conditions above need be used to determine whether or not to proceed to the connection establishment portion 34. Rather any one of them or any combination of them may be used depending upon the nature of the content in the program.

Referring to FIG. 4 the connection establishment portion of the applet is shown generally at 34. Effectively, the connection establishment portion 34, where appropriate, checks to see if an internet connection is active, establishes an internet protocol connection with the server, launches a browse session with the server uniform resource locator stored in the applet pointing to a user registration page permitting a user to enter registration information and cooperates with the key response portion 36 shown in FIG. 2 to determine whether or not the user has been sufficiently warned of impending deletion of files for failure to register and deletes files where such sufficient warning has occurred.

Referring back to FIG. 4, the determination of whether or not the user has been given sufficient warning that files will be deleted is made by a first block of instructions 50 which interact with a warning counter maintained by the key response portion 36 of the applet. Effectively, as will be seen below, the key response portion 36 maintains a count of the number of times a warning about file deletion is presented to the user.

The first block of instructions 50 directs the processor circuit 28 to read the value of the warning counter to determine whether or not the user has been warned a pre-defined number of times. If the user has been warned this pre-defined number of times, the processor circuit 28 is directed to block 52 which directs the processor circuit 28 to delete the content 24 and any data files created by the user, from the operational memory so that the processor circuit 28 is no longer able to use the content. Rather, the content would have to be reinstalled to enable it to be used again. Execution of the instruction codes 56 is then ended.

If at block 50 the processor circuit 28 determines that the pre-defined number of warnings have not been shown to the user, the processor circuit is directed to continue execution with the remainder of the connection establishment portion 34 of the applet.

The remainder of the connection establishment portion 34 of the applet includes block 54 which directs the processor circuit 28 to communicate with a task manger of the operating system to determine whether or not a communications session has already been established with at least one device, on a communications network. This may be done by using known methods for determining whether a browse session is active or pending, for example. At block 56, if a communications session has not been established, the processor circuit 28 is directed back to block 54. If a communications session has already been established however, block 58 directs the processor circuit 28 to create an IP connection to a uniform resource locator (URL) pointing to a user registration page hosted by the server 16, and to launch a browse session at the user computer 14 to permit the user to provide registration information to register as a user of the computer readable content. The processor circuit 28 is then directed to the key response portion 36 of the applet.

Upon completion of the connection establishment portion 34 the user is presented with a registration form from the server 16, prompting the user for information such as user identification, computer identification, program media identification, for identifying the CD-ROM 22 on which the content 24 was received, and/or product identification, for example. The server 16 thus acts as a web server.

If, for example, the owner of the content 24 were a provider of music and the content 24 itself were simply non-functional content such as an MP3 file, the server 16 or registration service at the server may be maintained by web server operated by the owner of the content or perhaps a copyright authority such as the American Society of Composers and Performers (ASCAP). Furthermore, where the program is provided over a computer network, the server which provides the content 24 to the user may also act as the web server to provide for registration.

When the user enters registration information onto the form presented by the server 16 and actuates a Aregister@ button on the registration page, the server receives the registration information at a "receiver" 41 of the server which in this embodiment is simply a web server interface. The server 16 then executes a program which validates the user registration information and, if appropriate, actuates a transmitter 43, which includes a program for communicating information from the web server 16 to the user computer, and which transmits back to the user computer 14 a key operable to cooperate with the user computer 14 to control subsequent operation of the content 24 and in this embodiment that involves deactivating execution of the instruction codes 26 embedded in the computer readable content 24 at the user computer 14.

Validating the user registration information may occur in a plurality of ways and the criteria for validation may vary widely. For example, simply determining that the user has entered what appear to be names and addresses in known formats may be sufficient to validate user registration information. Or, an identical match of a user id code with a predefined user id code may be required. Or user registration information may include credit card information, requiring the user to give a credit card number in order to use the program and validation may involve obtaining a charge authorization number from the corresponding credit issuer. In any event, the registration information is validated by or for the server 16 and the key is transmitted from the server 16 only when the registration information is successfully validated. The key may simply be a code recognizable by the instruction codes 26.

Referring to FIG. 5, the key response portion 36 is shown and begins with a block 60 which directs the processor circuit 28 to wait in the background while the browse session at the user computer 14 facilitating entry of user registration information is active. Effectively block 60 directs the processor circuit 28 to monitor transmissions from the server 16 to receive the key when it is sent by the server 16. Such transmissions may be in a hypertext transfer protocol (http) format, for example.

When a transmission containing the key is received at the user computer, block 60 directs the processor circuit 28 to block 62 which causes the processor circuit 28 to deactivate only the instruction codes 26, not the descriptive content 24, such that they can no longer be executed, and thus, execution of the instruction codes is completed and ended. Deactivation may be achieved by deleting the instruction codes 26 from the operational memory or by otherwise inhibiting their operation so that they cannot delete the content 24 from operational memory. Thus, subsequent use of the content 24 is enabled when a key is received at the user computer 14.

If at block 60, a key is not received within a designated time period, block 64 directs the processor circuit 28 to communicate with the task manager to determine whether or not the browse session has been closed. If it has not been closed, the processor circuit 28 is directed back to block 60 to continue to wait for the key.

When the user finally closes the browse session, block 66 directs the processor circuit 28 to open a message window to present a warning notice on a display of the user computer 14 to warn the user that files will be deleted if registration is not effected. For example the warning message may appear in a window with a red background and black text stating "PLEASE REGISTER NOW. FAILURE TO REGISTER WILL RESULT IN DELETION OF THIS PROGRAM AND OF THE FILES IT HAS CREATED A. Also in this message window, the user may be provided with a Aregister@ button causing the processor circuit 28 to be directed back to block 58 of the connection establishment portion 34 shown in FIG. 4 to repeat the connection to the server and URL providing the registration page.

Referring back to FIG. 5, if when presented with the warning message, should the user simply close the message window, block 68 directs the processor circuit 28 to increment the warning counter value, which maintains a count of the number of times the warning about deleting files is presented to the user, for reading by the processor circuit 28 at block 50 in the connection establishment portion 34 shown in FIG. 4 to determine whether or not the program should be disabled and the associated files deleted at block 52. A warning may be broadcast to the user indicating how many more warnings he/she will receive before file deletion.

Thus, when no key is received from the server 16 and more particularly when no key is received and the user has been warned more than some number of times, the subsequent use of the content is controlled and in this embodiment such control is effected by disabling further use of the content 24, as provided at block 52 in FIG. 4. Other means of control could alternatively be provided, such as disabling some features of the functional portion of the content 24, for example, or the content may be encrypted or scrambled by the instruction codes 26, for example.

It will be appreciated that by appropriate setting of the warning count threshold and the usage threshold, varying degrees of use and tolerance of non-registering users can be accommodated. For example, the usage threshold may be set to zero in which case a key would have to be obtained each time the user wanted to use the content. Or the usage threshold value may be set quite high to enable a user time to create important documents which are very valuable and which he/she cannot afford to lose.

From the foregoing it will be appreciated that using the invention described herein a user of computer readable content 24 is encouraged to register to become a registered user of the computer readable content as the consequences of not registering could result in deletion of important files and loss of use of the computer readable content.

While specific embodiments of the invention have been described and illustrated, such embodiments should be considered illustrative of the invention only and not as limiting the invention as construed in accordance with the accompanying claims.

The invention claimed is:

1. A method for encouraging users of computer readable content to register, the method comprising:
   executing instruction codes embedded in said computer readable content, when said content is in use by a processor circuit, to automatically establish a connection to a server to transmit registration information to said server and to control subsequent use of said content by said processor circuit in response to a key received from said server, wherein
   the instructions codes include self-executing application code,
   said content is non-functional descriptive content, and
   controlling subsequent use of said content comprises maintaining a count of the number of times a warning about deleting files is presented to a user of the processor circuit.

2. The method of claim 1 wherein controlling comprises deleting files produced by functional descriptive content in said computer readable content when said count exceeds a threshold value.

* * * * *